United States Patent Office 3,337,507
Patented Aug. 22, 1967

3,337,507
PROCESS FOR MAKING HIGH MOLECULAR WEIGHT COPOLYMERS OF TRIOXANE AND A POLYFORMAL
Klemens Gutweiler and Edgar Fischer, Frankfurt am Main, and Klaus Küllmar, Kelkheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 28, 1964, Ser. No. 363,286
Claims priority, application Germany, Apr. 30, 1963, F 39,627
4 Claims. (Cl. 260—67)

The present invention relates to high molecular weight copolymers and to a process for preparing them.

Copolymers of trioxan and cyclic ethers or cyclic formals have a wide range of use in industry. Interesting mechanical properties of these copolymers, for example the toughness properties, depend, however, on the molecular weight of these copolymers since these properties are improved as the molecular weight increases. As, furthermore, special methods of working-up require trioxan copolymers having a very high molecular weight and, consequently, a low melt index, it is desired to obtain such products in a reproducible manner.

According to the processes hitherto known, the copolymerization of trioxan is carried out in the presence of cationic catalysts in bulk at temperatures above the melting point of trioxan or in dispersion, for example, in a hydrocarbon, also at temperatures below the melting point of trioxan. Experience has shown, however, that the individual processes are of limited efficiency with respect to the melt indices of the resulting copolymers. Furthermore, copolymers having melt indices that are at the upper obtainable limit of such polymerization processes are difficult to obtain in a reproducible manner owing to the sensitivity of the polymerization to impurities.

It is also known that trioxan polymerizes in some cases already at the phase transition from the liquid to the solid state in the absence of a cationic catalyst to yield high molecular weight polyoxymethylene. The polyoxymethylene yield can be increased by introducing gaseous formaldehyde into the liquid trioxan prior to its crystallization. It has been tried in vain to utilize this polymerization taking place at the phase transition from the liquid to the solid state to obtain copolymers from batches of cyclic formals or cyclic ethers in liquid trioxan. In batches of liquid trioxan-dioxolan, for example, no polymer was formed at the phase transition from the liquid to the solid state even after the introduction of gaseous formaldehyde.

Now we have found that high molecular weight copolymers can be obtained by polymerizing a mixture of trioxan and a polyformal of the following formula —[—O—A—(OCH$_2$)$_m$—]—   (I)

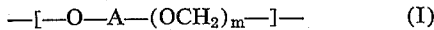

in which A represents a straight-chained or branched saturated or olefinically unsaturated aliphatic hydrocarbon radical having a halogen-substituted aliphatic side claim, if desired, or a cycloaliphatic radical or an aralkyl radical, and $m$ represents a whole number within the range of 1 to 20, advantageously 1 to 10, by cooling the mixture once or several times to a temperature which corresponds to at least that of the phase transition from the liquid to the solid state, the term "mixture" being here intended to mean a solution or dispersion. This polymerization yields high molecular weight copolymers, i.e. products having low melt indices which were determined in usual manner.

The polyformals to be dissolved or dispersed in trioxan can be obtained by homopolymerization of cyclic formals or copolymerization of cyclic formals or polymerizable ring ethers with trioxan in the presence of cationic catalysts or by polycondensation of dihydric alcohols or dihydric ol-thiol compounds (i.e. compounds having both an hydroxy group and a mercapto group) with formaldehyde.

Polyformals may be obtained, for example, by homopolymerization of dioxolan, 1,3,5-trioxepane, diethylene glycol formal, tetramethylene glycol formal, trimethylene glycol formal, butene-2-diol-1,4-formal or thiodiglycol formal, or by copolymerization of these substances with trioxan as the comonomer.

Polyformals may be obtained by copolymerization of such polymerizable ring ethers as, for example, ethylene oxide, propylene oxide, or their derivatives, for example epichlorohydrin, with trioxan.

The polyformals to be used in the process of the invention may also be obtained by polycondensation of dihydric alcohols or dihydric ol-thiol compounds which, because of their structure, favor the formation of linear polyformal over the formation of the cyclic form, with formaldehyde. Examples of suitable diol or ol-thiol compounds to be used for the manufacture of linear polycondensates are butane-1,4-diol, butene-2-diol-(1,4), hexane-1,6-diol, decane-1,10-diol, diethylene glycol, triethylene glycol, polyglycol, polypropylene oxide, cyclohexane-1,4-diol, 1,4-bis-hydroxymethyl cyclohexane, para-xylylene-glycol, hydrogenated 4,4'-dihydroxy-diphenylpropane, butanol-1-thiol-(4), thiodiglycol.

All the polyformals so obtained and used as primary polymers correspond to the following formula —[—O—A—(OCH$_2$)$_m$—]—   (I)

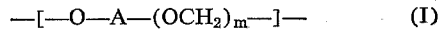

They may be made in known manner in a separate operation and must be dissolved or dispersed in trioxan to produce the copolymers. If polyformals of Formula I free from catalyst are used, polymerization on cooling takes place only after the introduction of gaseous formaldehyde into the solution or dispersion.

The copolymer yield can be increased by adding, instead of free formaldehyde, a cationic catalyst in an amount of 0.1 to 20 p.p.m. to the solution or dispersion of the polyformal in trioxan and maintaining the solution or dispersion, after the addition of the catalyst, for some time, which period of time is called "prepolymerization period," at temperatures above the melting point of the trioxan and ranging to about 150° C., while stirring the solution or dispersion, if desired, and with the application of pressure, if desired. During the prepolymerization period in the course of which a further turbidity may appear in the batch, free formaldehyde is formed. The amount of catalyst added to the solution or dispersion is not sufficient to achieve a complete polymerization of the solution or dispersion at temperatures above the melting point of the trioxan. If, however, after the addition of the catalyst and after the prepolymerization period, the solution or dispersion is cooled to temperatures corresponding to the phase transition from liquid to solid, a copolymer of high molecular weight is obtained in a good yield. This technique of polymerization is therefore epsecially suitable for those polyformals of Formula I which can be obtained only by the above polycondensation reaction.

The aforesaid technique is, of course, also applicable to polyformals that have been preformed in a different way. It is surprising that the yield can be considerably increased in any case if the solution or dispersion is passed through the phase transition several times.

It has furthermore been found that polyformals of Formula I that have been obtained by homopolymerization of cyclic formals or copolymerization of cyclic formals or cyclic ethers with trioxan in the presence of cationic catalysts can be dissolved or dispersed in liquid trioxan together with the catalyst still contained in the polyformals from their manufacture, during which procedure free formaldehyde is formed, if the amount of catalyst contained in the polyformals does not exceed 20 p.p.m. calculated on the solution or dispersion to be formed. In any case, the catalyst concentration is so small that no products of high molecular weight are formed in the liquid phase. If, however, such solution or dispersion is passed through the phase transition from the liquid to the solid state, if desired, after a prepolymerization period, copolymers which have melt indices hitherto not obtained by the known polymerization processes are obtained in a good yield. When carrying out the process of the invention, the preformed polyformal together with the catalyst contained in the polyformal from its manufacture is dissolved or dispersed in trioxan. This mode of working has the advantage over the use of processed polyformal free from catalyst that the polyformal does not come in contact with agents which may inhibit the polymerization or act as chain transfer agents and whose complete removal from the polyformal thus after-treated can be achieved only with difficulty. Also in this mode of executing the process of the invention, the yield can be increased by passing the solution or dispersion several times through the phase transition.

Besides the above modes of executing the process of the invention in which the polyformal is produced in a separate operation and subsequently dissolved or dispersed in trioxan, it has proved advantageous in some cases to produce the polyformal of Formula I directly in trioxan which serves in this case as solvent or dispersing agent and also as comonomer for the subsequent polymerization. When a cationic catalyst in an amount of 0.1 to 20 p.p.m. is added to the solution of a cyclic formal or cyclic ether in liquid trioxan, only a polyformal of Formula I is formed in addition to free formaldehyde during the prepolymerization period at temperatures above the melting point of the trioxan, the polyformal being obtained directly in the form of its solution or dispersion in the excess amount of trioxan. Contrary to what would be expected, the batch is not polymerized throughout after polymerization has set in. The polyformals which, with a short prepolymerization period, are dissolved in the excess amount of trioxan increase, for example, the viscosity of the batch. The isolated polyformals are wax-like products which contain almost the total amount of comonomer. If the prepolymerization period is prolonged to a sufficient degree, turbidity occurs in the batch. If the polymer formed is isolated at that moment, a wax-like product is obtained which, when isolated, for example, from a batch of 3½% by weight of dioxolan in trioxan, contains 5 to 6 methoxy groups per ethoxy group. If the prepolymerization period is prolonged beyond the moment at which turbidity occurs in the batch, further polymerization takes place only at an extremely low speed. However, if the solution or dispersion is passed through the phase transition from the liquid to the solid state once or several times, a copolymer of very high molecular weight is obtained in a good yield. The formation of polyformal of Formula I in the polymerization batch is of decisive importance for the copolymer yield obtained at the phase transition from the liquid to the solid state. For example, only small amounts of a polymer could be isolated from batches in which the solution of trioxan and dioxolan was crystallized immediately after the addition of the catalyst. Also, when the prepolymerization period was too short, the copolymer yield was reduced. Cyclic ethers, for example ethylene oxide, require a longer prepolymerization period or a somewhat higher catalyst concentration than do cyclic formals used as comonomers.

The efficiency of the process of the invention as compared with the known copolymerization processes can be seen from a comparison of the melt indices of the copolymers obtained by the individual processes. For a comparison, the values $i_{20}$ were used. The value $i_{20}$ indicates, in grams, the amount of molten polymer which is forced out of a standardized nozzle within 10 minutes at 190° C. under a load of 20 kg. (according to ASTM). The melt indices decrease as the molecular weight of the copolymers increases. While the known polymerization processes yield melt indices $i_{20} > 20$, copolymers having melt indices $i_{20}$ of 3 were obtained by the process of the invention.

The amount of catalyst contained according to the process of the invention during the prepolymerization period in a polymerization batch is within the range of 0.1 to 20 p.p.m., advantageously within the range of 1.5 to 10.0 p.p.m., calculated on boron fluoride.

The boron fluoride is advantageously used in the form of its complex compounds with water or organic compounds containing oxygen or sulfur, for example in the form of etherates or substituted diazonium salts, for example p-nitrophenyl-diazonium fluoroborate.

Instead of boron fluoride, other Lewis acids, for example $SnCl_4$, $SbCl_5$, $FeCl_3$, $TiCl_4$, and their organic or inorganic complex compounds may be used.

Further suitable catalysts are the oxonium salts of Lewis acids, for example trimethyl-, triethyl- or tripropyl oxonium tetrachloroferriate, trimethyl- or tripropyl oxonium hexachloroantimonate, bis-triethyloxonium hexachlorostannate, triethyl- or tripropyl oxonium fluoroborate.

The phase transition from the liquid to the solid state of the solution or dispersion of trioxan and a polyformal is advantageously carried out in a closed system.

The copolymers obtained by the process of the invention are thermostable and can be worked up in the thermoplastic range. They are particularly suitable for making bottles by blow molding owing to their low melt indices. They can, furthermore, be machined.

The following examples serve to illustrate the invention but they are not intended to limit it.

*Example 1*

In a closed vessel, 150 g. (1⅓ mols) trioxan and 74 g. (1 mol) dioxolan were polymerized at 70° C. in the presence of 20 mg. p-nitrophenyl-diazonium fluoroborate as a catalyst. The polyformal so obtained which was solid and wax-like at 70° C. was comminuted in water containing KOH to obtain a fine-grained material. The polyformal was subsequently washed with water until neutral and then washed several times with methanol. The product was dried at 70° C. in a vacuum drier.

35 g. of the dried polyformal were dissolved at 90° C. in 400 g. of trioxan. Gaseous formaldehyde was introduced into the viscous solution so obtained, and the solution was cooled in a tightly closed polyethylene bag while repeatedly kneading it. After cooling, the batch was boiled with methanol and the residue dried at 70° C. The copolymer was obtained in a yield of 25%. For alkaline degradation, 50 g. of the copolymer were heated to 160° C. in 500 cc. benzyl alcohol and 12.5 cc. triethanol amine, while stirring, during which procedure the copolymer passed into solution. The solution was kept at the aforesaid temperature for a further 15 minutes and then cooled. The polymer which had precipitated on cooling was suction-filtered, boiled several times with methanol and dried at 70° C. in a vacuum drier. The loss on alkaline degradation amounted to 16% (homopolymers of trioxan lose 70 to 80% of their weight under the same conditions).

*Example 2*

35 g. of the polyformal described in Example 1 were dissolved at 90° C. in 400 g. trioxan. To the viscous solution so obtained 4 mg. p-nitrophenyl-diazonium fluoroborate were added and the solution was stirred for a further 15 minutes at 90° C. Subsequently the still clear solution was subdivided.

(A) 100 g. of the solution were kept for a further 45 minutes at 70° C. in a closed vessel. After about 20 minutes turbidity occurred in the batch. After 45 minutes the batch was stirred in methanol to which a small amount of ethanol amine had been added. The precipitated polymer was suction-filtered, washed with methanol and dried. A polymer wax-like substance was obtained in a yield of 9.5%. The amount by weight of the isolated polymer was only slightly above the amount by weight of polyformal which had been dissolved in 100 g. trioxan each.

(B) The remaining portion of the solution was cooled in a closed polyethylene bag. After cooling, the batch was boiled with methanol to which 1% of ethanol amine had been added, filtered off, washed with methanol and dried at 70° C. for 20 hours. The polymer was obtained in a yield of 57%.

For alkaline degradation, 100 g. of the copolymer were kept together with 700 g. water containing 1% of $NH_3$ for 30 minutes at 146° C. in an autoclave provided with a stirrer.

The loss on degradation was 4%.

The hydrolyzed product was stabilized with 0.2% of dicyan diamine and 0.7% of 2,2-methylene-bis-(4-methyl-6-tert. butyl-phenol). The thermal degradation of the stabilized product was carried out in a manner such that 5 g. of the product were kept for 45 minutes at 230° C. in the presence of air.

The loss in weight on thermal degradation was 0.04% per minute.

On another test sample of the stabilized product, the melt index $i_{20}$ was measured. The value $i_{20}$ indicates, in grams, the amount of molten polymer which is forced out of a standard nozzle in 10 minutes at 190° C. with an external load of 20 kg. exerted on the molten polymer.

A value $i_{20}$ of 11.0 was determined.

*Example 3*

In a manner analogous to that described in Example 1, a polyformal was prepared from 150 g. (1⅔ mols) trioxan and 74 g. (1 mol) dioxolan.

41 g. of the processed polyformal free from catalyst were stirred at 90° C. in 400 g. trioxan. The polyformal was not dissolved to yield a clear solution but was only dispersed in the trioxan. To the dispersion so obtained 4 mg. p-nitrophenyl-diazonium fluoroborate were added and the whole was stirred for a further 6 minutes. The batch was then cooled in a polyethylene bag.

The processing of the batch, the alkaline degradation and the stabilization were carried out in a manner analogous to that described in Example 2B.

The following values were found:

Polymer yield—51%
Loss on alkaline degradation—7%
Loss in weight on thermal degradation—0.04% per minute
Melt index—$i_{20}$ 15.1

*Example 4*

30 g. (⅓ mol) trioxan and 74 g. (1 mol) dioxolan were polymerized at 70° C. in the presence of 30 mg. p-nitrophenyl-diazonium fluoroborate as a catalyst.

Of the polyformal so obtained, which constituted a clear highly viscous oil at 70° C., 19 g. were dissolved at 85° C. in 400 g. trioxan while stirring and the viscous clear solution so obtained was kept for 5 minutes at that temperature and subsequently cooled in a polyethylene bag. The crystals were ground, boiled with methanol to which 1% of ethanol amine had been added and then dried.

The polymer was obtained in a yield of 65%.

The alkaline degradation and the stabilization were carried out in a manner analogous to that described in Example 2B.

The following values were found:

Loss on alkaline degradation—4%
Loss in weight on thermal degradation—0.035% per minute
Melt index—$i_{20}$ 3.5

*Example 5*

400 g. trioxan and 13 g. dioxolan were kept at 80° C. together with 6.5 mg. p-nitrophenyl-diazonium fluoroborate. After 6 minutes turbidity occurred in the batch. The batch was then immediately subdivided.

(A) 100 g. of the batch were further polymerized for 30 minutes at 80° C. in a closed vessel.

The processing was carried out as described in Example 2A.

The polymer substance was obtained in a yield of 15%.

(B) The remaining portion of the batch was cooled in a polyethylene bag. The processing of the ground crystals, the alkaline degradation and the stabilization were carried out as described in Example 2B.

The following values were found:

Polymer yield—63%
Loss on alkaline degradation—3.5%
Loss on thermal degradation—0.05% per minute
Melt index—$i_{20}$ 4.0

*Example 6*

400 g. trioxan and 13 g. dioxolan were kept at 80° C. together with 6.5 mg. p-nitrophenyl-diazonium fluoroborate. After 5½ minutes turbidity occurred in the batch.

The batch was cooled to 30° C. in a vessel provided with a stirrer and a cooling jacket and the mass was then immediately heated again to 80° C., while stirring. This temperature was kept constant for 5 minutes and the mixture was then cooled again, while stirring. This procedure was repeated once. The polymer so obtained was boiled with methanol containing 1% of ethanol amine and was subsequently dried.

The polymer was obtained in a yield of 88%.

*Example 7*

This example is intended to demonstrate that the polymer yield at the phase transition from the liquid to the solid state depends on the formation of the polyformal in the trioxan during the prepolymerization period.

6.5 mg. p-nitrophenyl-diazonium fluoroborate were added to 400 g. liquid trioxan and 13 g. dioxolan and the whole was immediately cooled in a polyethylene bag.

A polymer was obtained in a yield of 2%.

*Example 8*

30 mg. p-nitrophenyl-diazonium fluoroborate were added at 80° C. to 2000 g. trioxan and 66 g. dioxolan. After 5 minutes turbidity occurred in the batch. The batch was immediately cooled in a polyethylene bag.

The batch was ground and then processed, subjected to alkaline degradation and stabilized in a manner analogous to that described in Example 2B.

The following values were obtained:

Polymer yield—73%
Loss on alkaline degradation—2.5%
Loss on thermal degradation—0.04% per minute
Melt index—$i_{20}$ 2.9

*Example 9*

10 mg. p-nitrophenyl-diazonium fluoroborate were added at 80° C. to 400 g. trioxan and 8 g. ethylene oxide. After 38 minutes turbidity occurred in the batch. The batch was cooled in a polyethylene bag.

The processing, alkaline degradation and stabilization were carried out in a manner analogous to that described in Example 2B.

The following values were found:

Polymer yield—61%
Loss on alkaline degradation—3.5%
Loss on thermal degradation—0.04% per minute
Melt index—$i_{20}$ 3.0

We claim:
1. In a process for the manufacture of high molecular weight copolymers by polymerizing a mixture of trioxan and a polyformal in the presence of a cationic catalyst, said polyformal having the formula

$$—[—O—A—(OCH_2)_m—]—$$

wherein A has from 2 to 20 carbon atoms and is a member selected from the group consisting of a saturated aliphatic hydrocarbon radical, an olefinically unsaturated hydrocarbon radical, a saturated aliphatic hydrocarbon radical containing a halogenated side chain, a cycloaliphatic hydrocarbon radical and an araliphatic radical, and m is a whole number from 1 to 20, the improvement wherein polymerization is initiated in a mixture of said polyformal in liquid trioxan containing from 0.1 to 20 parts per million of said cationic catalyst by cooling the mixture at least once to the temperature of the phase transition of the mixture from the liquid state to the solid state.

2. A process as claimed in claim 1 wherein the polymerization is carried out at the temperature of the phase transition from the liquid to the solid state.

3. A process as claimed in claim 1 wherein free formaldehyde is introduced into the mixture prior to cooling.

4. A process as claimed in claim 1 wherein the mixture is kept, prior to cooling, at temperatures above the melting point of trioxan until free formaldehyde is formed.

References Cited

UNITED STATES PATENTS 3,256,246   6/1960   Gutweiler et al. _____ 260—67

FOREIGN PATENTS 1,271,297   7/1961   France.
1,323,465   2/1963   France.
1,346,543   11/1963   France.
1,346,545   11/1963   France.

OTHER REFERENCES

Kern et al.: Angewandte Chemie, 73(6), 177–186, March 21, 1961, (p. 182 relied on).

WILLIAM H. SHORT, *Primary Examiner.*

L. M. MILLER, *Assistant Examiner.*